(12) United States Patent
Robinson, Sr. et al.

(10) Patent No.: US 6,503,467 B1
(45) Date of Patent: Jan. 7, 2003

(54) CHEMICAL DISPENSER WITH REMOVABLE COVER LAYER

(76) Inventors: Jerry F. Robinson, Sr., 1781 Old Hwy 5 South, Thomasville, AL (US) 36784; Gerald Reid, Sr., 5825 Ordway St., Riverside, CA (US) 92504

( * ) Notice: Subject to any disclaimer, the term of this patent is extended or adjusted under 35 U.S.C. 154(b) by 0 days.

(21) Appl. No.: 09/685,862

(22) Filed: Oct. 9, 2000

(51) Int. Cl.⁷ .................................................. B01F 1/00
(52) U.S. Cl. ...................... 422/265; 422/276; 422/277; 137/268
(58) Field of Search ................................ 422/265, 261, 422/264, 276, 277; 119/2, 3; 137/268

(56) References Cited

U.S. PATENT DOCUMENTS

| | | |
|---|---|---|
| 3,604,020 A | 9/1971 | Moisa |
| 4,137,868 A * | 2/1979 | Pryor ............................. 119/2 |
| 4,350,666 A | 9/1982 | Klutts |
| 4,664,065 A | 5/1987 | Schneider |
| 5,064,624 A * | 11/1991 | King ............................ 422/264 |
| 5,143,020 A * | 9/1992 | Patrick ............................ 119/3 |
| 5,312,601 A | 5/1994 | Patrick |
| 5,433,173 A * | 7/1995 | Markles, Jr. ................ 119/231 |
| 5,535,701 A | 7/1996 | Markles, Jr. |
| 5,613,465 A | 3/1997 | Moore |
| 5,967,087 A | 10/1999 | Markles, Jr. |

* cited by examiner

Primary Examiner—Robert J. Warden, Sr.
Assistant Examiner—Sean E. Conley
(74) Attorney, Agent, or Firm—McKenna Long & Aldridge LLP

(57) ABSTRACT

A device for dispensing chemical agents into a body of water includes a plastic, bucket-like container having the chemical agents disposed therein. The side walls of the container are perforated with a plurality of perforations. Wrapped around the outside walls of the container is a removable cover layer disposed over the perforations. Disposed within the container is a layer of closed cell foam to provide the container with sufficient buoyancy to float at the surface of a body of water. The device is especially useful in the fertilization of algae growth within a lake or pond.

36 Claims, 3 Drawing Sheets

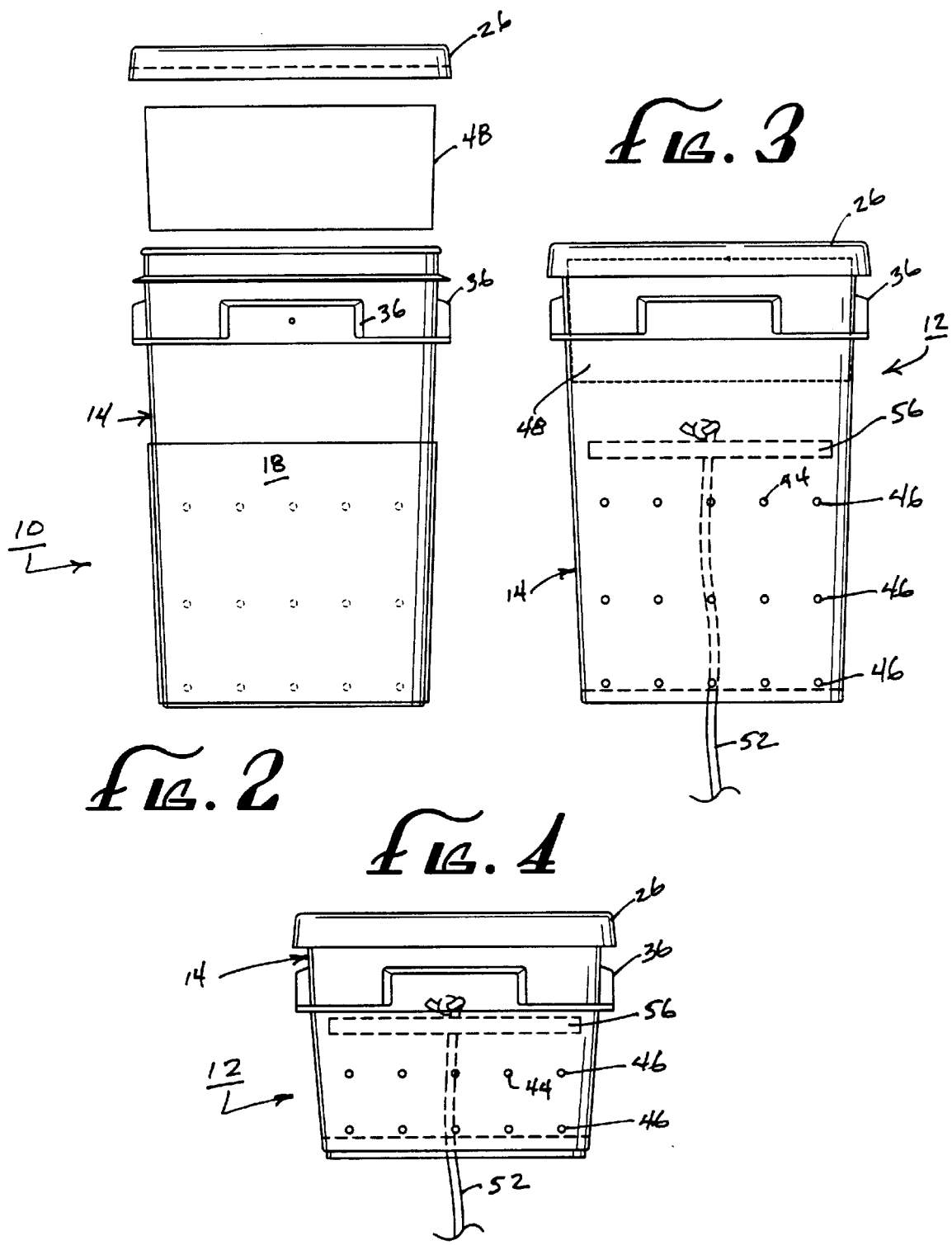

CHEMICAL DISPENSER WITH REMOVABLE COVER LAYER

FIELD OF THE INVENTION

This invention relates generally to devices for dispensing chemical agents into a body of water and, more specifically, to such devices adapted to dispense algae fertilizer into a lake or pond.

BACKGROUND OF THE INVENTION

To maintain a lake or pond as a proper habitat for fish, it is important to maintain the upper three or four feet of the lake or pond rich in dispersed algae growth. Such algae growth provides most of the nutrition to support fish within the lake or pond.

To properly maintain a three to four foot upper layer rich in dispersed algae growth, a manager of a lake or pond must usually fertilize the lake or pond at regular intervals. The chemical agents used in such fertilization typically contain nitrates and phosphate.

The most common method used to disperse fertilizer into a lake or pond is by sowing the fertilizer into the lake or pond by hand. However, this requires a great deal of physical effort and does not properly dispense the fertilizer gradually over time.

Attempts have been made to create floatable fertilizer dispensers, but such prior art efforts have not been particularly successful. Most notably, such prior art efforts have resulted in complex dispensing structures which are expensive to manufacture, transport and use. Also, devices of the prior art are not particularly in successful in evenly dispensing fertilizer in gradual manner over a long period of time, such as over about two-four weeks.

Accordingly, there is a need for an approved pond fertilizing device which avoids the above-mentioned problems in the prior art.

SUMMARY OF THE INVENTION

The invention satisfies this need. The invention is a combination for dispensing chemical agents into a body of water. The combination comprises a subcombination which includes a container and chemical agents within the container. The container has a top, a bottom and side walls. The side walls are perforated with a plurality of perforations, each having an open area between about 0.004 square inches and about 0.5 square inches. Wrapped around the outside walls of the container is a removable cover layer disposed over the perforations in the side walls of the container. Such removable cover layer protects chemical agents within the container and prevents the leakage of chemical agents out of the container. When the combination is ready for use as a dispenser of the chemical agents into a body of water, the removable cover layer is removed and the subcombination is floated onto the body of water. Over time, water seeps into the container through the perforations, mixes with and dissolves the chemical agents and seeps out again through the perforations into the body of water. By use of the invention, the chemical agents are gradually dispensed into the body of water over a period of about two-four weeks, depending upon weather conditions.

The container is typically an inexpensive plastic-walled bucket-like device having a sealed top lid.

In a preferred embodiment, the container contains an upper layer of closed cell foam to give the container additional buoyancy. Also, an anchor is preferably provided to retain the container at a particular location within the lake or pond.

DESCRIPTION OF THE DRAWINGS

These and other features, aspects and advantages of the present invention will become better understood with reference to the following description, appended claims and accompanying drawings where:

FIG. 2 is an exploded side view of the combination illustrated in FIG. 1;

FIG. 3 is a cross-sectional side view of the combination illustrated in FIG. 1;

FIG. 4 is a side view of a second combination having features of the invention.

DETAILED DESCRIPTION

Figure 1:
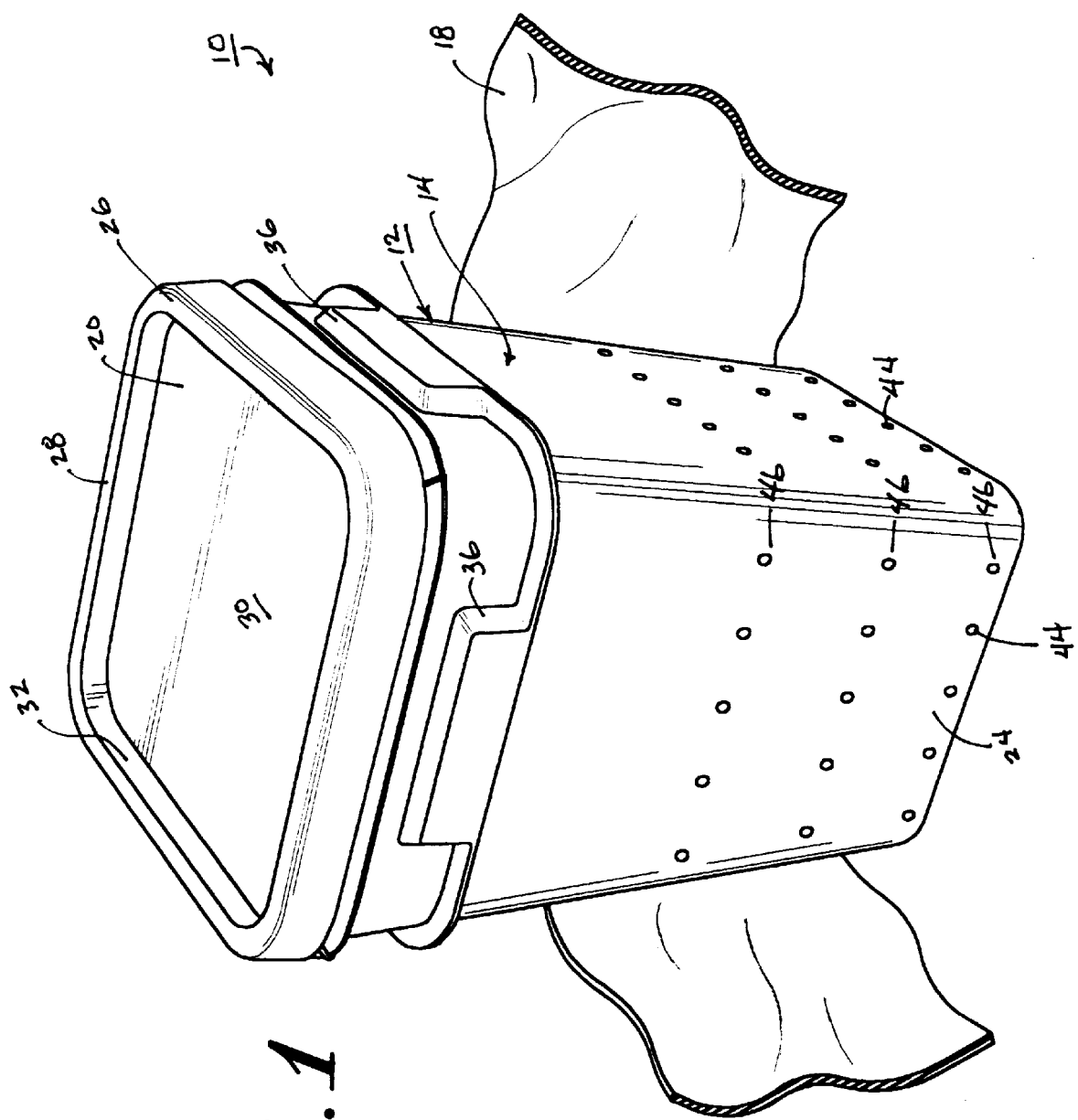
FIG. 1 is a perspective view of a combination having features of the invention.
Figure 5:
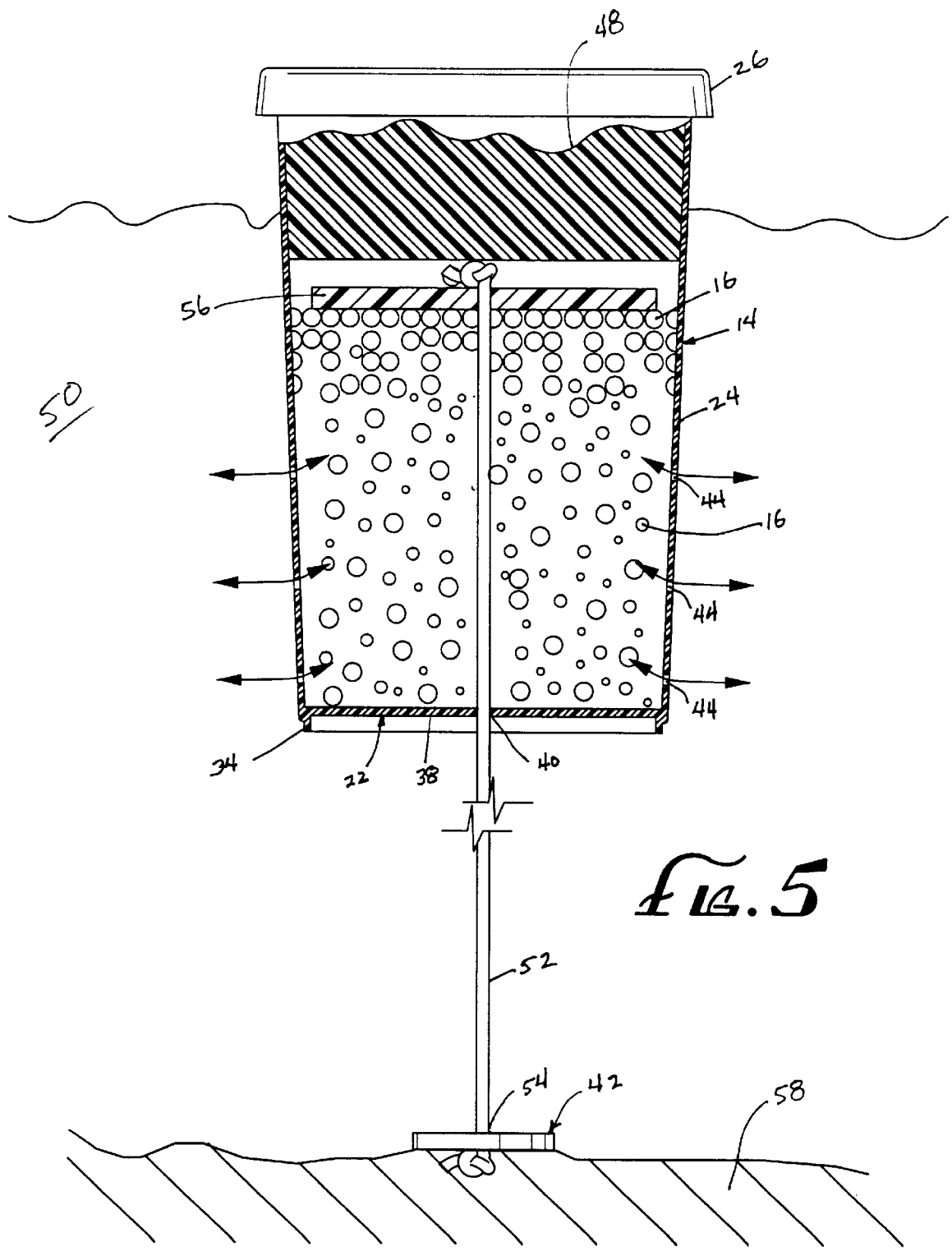
FIG. 5 is a cross-sectional side view of the combination illustrated in FIGS. 1–3, this view illustrating a portion of the combination in operation.

The following discussion describes in detail one embodiment of the invention and several variations of that embodiment. This discussion should not be construed, however, as limiting the invention to those particular embodiments. Practitioners skilled in the art will recognize numerous other embodiments as well.

The invention is a combination 10 comprising the subcombination 12 of a container 14 with between about 2 pounds and about 50 pounds of chemical agents 16 disposed within the container 14 and a removable cover layer 18 disposed around the outside of the container 14.

The container 14 is typically made from an inexpensive plastic, such as polyethylene. The container 14 has a top wall 20, a bottom wall 22 and side walls 24.

In the embodiments illustrated in the drawings, the top wall 20 of the container 14 is provided by a planar lid 26. The lid 26 has a periphery 28 and a central portion 30. The periphery 28 is about ½ inch wide and completely circumscribes the lid 26. The central portion 30 is recessed a distance of about ½ inch below the periphery 28.

The innermost vertical sides 32 of the periphery 28 are configured and dimensioned to match the outside periphery 34 of the bottom wall 22. This feature allows like containers 14 to be stably stacked upon one another. Because the periphery 28 of the lid 26 matches the outside periphery 34 of the bottom wall 22, each container 14 snugly nests into the lid 26 of the next-below container 14.

Typically, the lid 26 is sealed to the side walls 24 with a suitable cement or heat treatment.

In the embodiments illustrated in the drawings, handles 36 are integrally formed in each of the side walls 24 to facilitate lifting and carrying of the container 14.

In the embodiments illustrated in the drawings, the bottom wall 22 of the container 14 has an outside periphery 34 and a recessed central portion 38. The central portion 38 is recessed with respect to the outside periphery 34 by a distance of about ¼ inch. The outside periphery 34 of the bottom wall 22 can be a short vertical flange having a thickness of about 3/32 inch.

The bottom wall 22 preferably has a central aperture 40 disposed approximately in the center of the bottom wall 22. The central aperture 40 typically has a diameter of about 1.25 inches. The central aperture 40 is useful in retaining an anchor 42 (as described below).

In the embodiments illustrated in the drawings, the side walls 24 are provided by four planar side wall panels having identical dimensions. The side walls 24 are slightly tapered outwardly from the bottom wall 22 of the container 14 to the top wall 20 of the container 14. In the embodiment illustrated in FIGS. 1–3, the container 14 has a height of about 13.75 inches, the lid 26 is essentially a 9.75 inches by 9.75 inches square and the bottom wall 22 is essentially an 8.375 inches by 8.375 inches square. Such typical container 14 retains about 20 pounds of pond fertilizing chemical agents 16.

In a second typical embodiment as illustrated in FIG. 4, the container 14 has four slightly tapered side walls 24 and has a height of about 7.75 inches. In this embodiment, the lid 26 is essentially a 9.750 by 9.750 inches square, the bottom wall 22 is essentially an 8.375 inches by 8.375 inches square. In this second typical embodiment, the container 14 retains about 10 pounds of pond fertilizing chemical agents 16.

The side walls 24 have a plurality of side wall perforations 44 defined therethrough. The side wall perforations 44 allow the seepage of water into the container 14 and the reverse seepage of chemical agents 16 and water out of the container 16 when the subcombination 12 is in use. The side wall perforations 44 can be of any desired shape. The side wall perforations 44 can be disposed in any particular pattern or they can be disposed randomly. In the embodiment illustrated in FIGS. 1–3 and 5, the side wall perforations 44 are adapted to disperse dry dissolvable chemical agents 16 such as a mixture of nitrates and phosphates. In this case, the side wall perforations 44 are provided by three rows 46 of five round perforations on each side wall 24, each side wall perforation 44 having a diameter of about ¼ inch. The center line of each round side wall perforation 44 in each row 46 is separated from the center line of an adjacent side wall perforation 44 by a distance of about 32 mm. In the embodiment illustrated in FIG. 4, the side wall perforations 44 are provided by two rows 46 of round perforations, each having a diameter of about ¼ inch. The center line of each round side wall perforation 44 is separated from the central line of an adjacent side wall perforation 44 by a distance of about 32 mm.

In all cases, the size of the side wall perforations 44 will depend upon the size and type of chemical agents 16. Where the chemical agents 16 are in liquid form, the side wall perforations 44 are relatively small, for example, 0.004 square inches to 0.02 square inches. Where the chemical agents 16 are dissolvable dry chemicals, the size the of side wall perforations 44 are somewhat larger, for example, 0.02 square inches to 0.05 square inches. Where the chemical agents 16 are non-dissolving granular material, the size of the side wall perforations 44 are relatively large, for example, 0.05 square inches to 0.5 square inches.

Preferably, a flotation enhancer 48 is disposed above the chemical agents 16 within the container 14. The flotation enhancer 48 can be a solid layer of closed cell foam, such as polyurethane or styrofoam. The flotation enhancer 48 can also be any other suitable construction, such as a sealed compartment within the container 14 or a plurality of closed cell foam pieces. In the embodiment illustrated in FIGS. 1–3 and 5, the flotation enhancer 48 is a solid layer of closed cell foam which fully occupies the upper 6 inches of the container 14. The flotation enhancer 48 is disposed within the container 14 to give the container sufficient buoyancy so that it will float, both immediately after the container 14 is placed within a body of water 50 and after the communication of liquids between the body of water 50 and the interior of the container 14 has reached equilibrium.

The chemical agents 16 can be any of a wide variety of chemical agents 16 which may be desired to be dispensed into the body of water 50. The chemical agents 16 can be liquid or they can be dry. In a typical combination of the invention used to fertilize a lake or pond, the chemical agents 16 are typically dry algae fertilizers. Such fertilizers can be in powdered form or they can be in granular form. Algae fertilizers used to fertilize lakes or ponds are typically high in nitrates and phosphates. One typical algae fertilizer contains about 18 weight percent nitrates and about 46 weight percent phosphates. Another similar formula contains about 11 weight percent nitrates and about 52 weight percent phosphates.

The subcombination 12 is also ideal in dispersing other chemical agents 16 into a body of water 50. Such other chemical agents 16 can be, for example, copper sulfate (such as for reducing algae within a body of water 50), granular cotton seed meal or meat scraps (for attracting fish within a body of water 50) or dehydrated algae (for directly providing a quantity of additional algae to a body of water 50).

Preferably, the invention further comprises an anchor 42 tethered to the container 14 via an anchor line 52. The anchor line 52 is preferably made from a biodegradable material, such as cotton or jute. In the embodiments illustrated in the drawings, the anchor 42 is a disk having the shape of a large metal washer. In such embodiments, the anchor 42 is round and has an outside diameter of about 3 inches and a thickness of about ⅛ inch. Disposed near the center of the anchor 42 is an anchor aperture 54 of about ¼ inch in diameter to accept and retain the lower end of the anchor line 52. Such anchor 42 weighs about 4 ounces.

Where it is desired to fully submerge the subcombination 12, such as for use in the dispensing of granulated meat scraps, an anchor 42 having sufficient weight to overcome the buoyancy of the subcombination 12 is used.

Prior to use, the anchor 42 is attached to the underside of the bottom wall 22 of the container 14, such as with double stick tape. The anchor 42 is preferably fully disposed within the recessed central portion 38 in the bottom wall 22.

Preferably, the anchor line 52 is fastened to the container 14 by being attached to a horizontal spacer disk 56 which is disposed between the flotation enhancer 48 and the chemical agents 16 within the container 14. The upper end of the anchor line 52 is attached to the spacer disk 56 as illustrated in the drawings. The spacer disk 56 is sized and dimensioned to provide a thin moveable horizontal wall separating the flotation enhancer 48 from the chemical agents 16. The spacer disk 56 is further sized and dimensioned to allow it to move downwardly within the container 14 (while maintaining a horizontal orientation). The spacer disk 56 is made from a material which floats in water. The upper end of the anchor line 52 is attached at the center of the spacer disk 56. By this design, the natural bobbing of the subcombination 12 at the surface of a body of water 50 (such as caused by wave action at the surface of the body of water 50) results in the spacer disk 56 moving up and down within the container 14. This up and down movement creates a pumping action which tends to alternatively force fluids out of the container 14 into the body of water 50 and draw in water from the body of water 50 into the container 14. Such pumping action has been found to effectively mix water from the body of water 50 with the chemical agents 16 within the container 14 and to effectively and completely pump the chemical agents 16 out of the container 14 into the body of water 50. The pumping action of the spacer disk 56 is maximized when the density of the spacer disk 56 is only slightly less than the density of water. In a typical embodiment, such as illustrated in the drawings, the spacer disk 56 can be provided by a ½ inch layer of closed cell foam having an outer perimeter which is inset from the side walls 24 of the container 14 by about ¼ inch.

The removable cover layer 18 is initially disposed over the side wall perforations 44 to protect the chemical agents 16 within the container 14 and to prevent the leakage of the chemical agents 16 from the container 14 prior to use. The removable cover layer 18 is typically made from a flexible material, such as a plastic sheet or strip of paper. It is important that the removable cover layer 18 be easily removable when a user wishes to make use of the combination 10. Accordingly, when the cover layer 18 is a flexible sheet of material, the cover layer 18 is typically attached to the side walls 24 of the container 14 with a suitable low-tack adhesive. The removable cover layer 18 can also comprise a plurality of individual strips, each strip being disposed over one of the rows of side wall perforations 44.

Other forms of removable cover layer 18 can also be used, so long as the removable cover layer 18 seals the side wall perforations 44 and is easily removed prior to use. For example, the removable cover layer 18 can be provided by a sleeve made from a rigid material, such as from a rigid plastic. The sleeve is sized and dimensioned to readily slip over the side walls 24 of the container 14 and conform tightly, but reversibly, thereto.

In operation, the combination 10 is used as follows. The user first disengages the anchor 42 from the bottom wall 22 of the container 14 and removes the removable cover layer 18 from the side walls 24 of the container 14. The user then floats the subcombination 12 at a desired location within a body of water 50. The anchor 42 rests at the bottom 58 of the body of water 50 and tends to retain the container 14 at the desired location. (See FIG. 5.) After the container 14 is floated within the body of water 50, water begins to seep through the side wall perforations 44 and mixes with and/or dissolves the chemical agents 16 within the container 14. As the chemical agents 16 become thoroughly mixed/dissolved with water within the container 14, the chemical agents 16 seep out of the container 14 via the side wall perforations 44. This is facilitated by the pumping action of the spacer disk 56 as the container 14 bobs up and down at the surface of the body of water 50. Because the side wall perforations 44 are relatively small, the initial mixing/dissolving of the chemical agents 16 by water seeping into the container 14 and the subsequent passage out of the container 14 by the chemical agents 16 takes place gradually over time. Thus, the chemical agents 16 are slowly and evenly released into the body of water 50.

Having thus described the invention, it should be apparent that numerous structural modifications and adaptations may be resorted to without departing from the scope and fair meaning of the instant invention as set forth hereinabove and as described hereinbelow by the claims.

What is claimed is:

1. A combination useful for dispensing chemical agents into a body of water, the combination comprising:
    (a) a subcombination comprising:
        (i) a container having a top, a bottom and side walls, the side walls being perforated with a plurality of side wall perforations, the side wall perforations each having an open area between about 0.004 square inches and about 0.5 square inches;
        (ii) chemical agents within the container;
        (iii) a flotation enhancer disposed above said chemical agents, and
        (iv) a spacer disk loosely disposed horizontally between the flotation enhancer and the chemical agents; and
    (b) a removable cover layer disposed over the perforations to prevent leakage through the side wall perforations until the cover layer is removed;
    wherein, when the cover layer is removed, the subcombination floats in a body of water and the chemical agents seep into the body of water via the side wall perforations.

2. The combination of claim 1 wherein, when the cover layer is removed and the subcombination is floated in the body of water, water from the body of water seeps into the container via the side wall perforations until equilibrium is established, and after equilibrium is established, the subcombination continues to float in the body of water.

3. The combination of claim 1 wherein the container further comprises a top wall and a bottom wall and wherein the bottom wall is adapted to nest within the top wall of a like container, so that a plurality of containers can be stably stacked upon one another.

4. The combination of claim 1 wherein the container comprises four flat side walls, each of which are tapered outwardly from the bottom of the container to the top of the container.

5. The combination of claim 1, wherein the cover layer is made from a flexible material.

6. The combination of claim 1 wherein the chemical agents are dry.

7. The combination of claim 1 wherein the flotation enhancer is a layer of closed cell foam.

8. The combination of claim 1 wherein the spacer disk is attached to an anchor by an anchor line.

9. The combination of claim 1 wherein the chemical agents are algae fertilizers.

10. The combination of claim 1 wherein the chemical agents comprise nitrates, phosphorous and potash.

11. The combination of claim 1 wherein the chemical agents comprise 5–15 weight percent nitrates and 40–60 weight percent phosphates.

12. The combination of claim 1 wherein the container contains between about 2 and about 50 pounds of chemical agents.

13. A combination useful for dispensing fertilizing chemical agents into a body of water, the combination comprising:
    (a) a subcombination comprising:
        (i) a container having a top, a bottom and side walls, the side walls being perforated with a plurality of side wall perforations, the side wall perforations each having an open area between about 0.02 square inches and about 0.05 square inches;
        (ii) dry chemical agents within the container;
        (iii) a flotation enhancer disposed above said chemical agents,
        (iv) a spacer disk loosely disposed horizontally between the flotation enhancer and the chemical agents; and
        (v) an anchor tethered to the container via an anchor line; and
    (b) a removable cover layer disposed over the perforations to prevent leakage through the side wall perforations until the cover layer is removed, the cover layer comprising a flexible material;

wherein, when the cover layer is removed, the subcombination floats in a body of water and the chemical agents seep into the body of water via the side wall perforations; and wherein, when the subcombination is floated in a body of water, water from the body of water seeps into the container via the side wall perforations until equilibrium is established, and after equilibrium is established, the subcombination continues to float in the body of water.

14. The combination of claim 13 wherein the chemical agents are algae fertilizers.

15. The combination of claim 13 wherein the flotation enhancer is a layer of closed cell foam.

16. The combination of claim 13 wherein the spacer disk is attached to an anchor by an anchor line.

17. A combination useful for useful for dispensing algae fertilizers into a body of water, the combination comprising:
   (a) a subcombination comprising:
      (i) a container having a top, a bottom and side walls, the side walls being perforated with a plurality of side wall perforations, the perforations each having an open area between about 0.02 square inches and about 0.05 square inches;
      (ii) dry algae fertilizers within the container;
      (iii) an upper layer of closed cell foam disposed above the chemical agents;
      (iv) a flotation enhancer disposed above said chemical agents,
      (v) a spacer disk loosely disposed horizontally between the flotation enhancer and the chemical agents; and
      (vi) an anchor tethered to the container via an anchor line; and
   (b) a removable cover layer disposed over the side wall perforations to prevent leakage through the side wall perforations until the cover layer is removed, the cover layer comprising a flexible material; and
   wherein, when the cover layer is removed, the subcombination floats in a body of water and the chemical agents seep into the body of water via the side wall perforations; and
   wherein, when the subcombination is floated in a body of water, water from the body of water seeps into the container via the side wall perforations until equilibrium is established, and after equilibrium is established, the subcombination continues to float in the body of water.

18. A combination useful for dispensing chemical agents into a body of water, the combination comprising:
   (a) a subcombination comprising:
      (i) a container having a top, a bottom and side walls, the side walls being perforated with a plurality of side wall perforations, the side wall perforations each having an open area between about 0.004 square inches and about 0.5 square inches; and
      (ii) chemical agents within the container; and
   (b) a removable cover layer disposed over the perforations to prevent leakage through the side wall perforations until the cover layer is removed; and
   wherein said container further comprises a top wall and a bottom wall; wherein the bottom wall is adapted to nest within the top wall of a like container, so that a plurality of containers can be stably stacked upon one another; and
   wherein, when the cover layer is removed, the subcombination floats in a body of water and the chemical agents seep into the body of water via the side wall perforations.

19. The combination of claim 18 wherein, when the cover layer is removed and the subcombination is floated in a body of water, water from the body of water seeps into the container via the side wall perforations until equilibrium is established, and after equilibrium is established, the subcombination continues to float in the body of water.

20. The combination of claim 18 wherein the container comprises four flat side walls, each of which are tapered outwardly from the bottom of the container to the top of the container.

21. The combination of claim 18 wherein the cover layer is made from a flexible material.

22. The combination of claim 18 wherein the chemical agents are dry.

23. The combination of claim 18 further comprising a flotation enhancer disposed above the chemical agents.

24. The combination of claim 23 wherein the flotation enhancer is a layer of closed cell foam.

25. The combination of claim 23 wherein a spacer disk is loosely disposed horizontally between the flotation enhancer and the chemical agents.

26. The combination of claim 25 wherein the spacer disk is attached to an anchor by an anchor line.

27. The combination of claim 18 wherein the chemical agents are algae fertilizers.

28. The combination of claim 18 wherein the chemical agents comprise nitrates, phosphorous and potash.

29. The combination of claim 18 wherein the chemical agents comprise 5–15 weight percent nitrates and 40–60 weight percent phosphates.

30. The combination of claim 18 wherein the container contains between about 2 and about 50 pounds of chemical agents.

31. A combination useful for dispensing fertilizing chemical agents into a body of water, the combination comprising:
   (a) a subcombination comprising:
      (i) a container having a top, a bottom and side walls, the side walls being perforated with a plurality of side wall perforations, the perforation each having an open area between about 0.02 square inches and about 0.05 square inches;
      (ii) dry chemical agents within the container;
      (iii) a flotation enhancer disposed above the chemical agents; and
      (iv) an anchor tethered to the container via an anchor line; and
   (b) a removable cover layer disposed over the side wall perforations to prevent leakage through the side wall perforations until the cover layer is removed, the cover layer comprising a flexible material;
   wherein the combination further comprises a top wall and a bottom wall; wherein the bottom wall is adapted to nest within the top wall of a like container, so that a plurality of containers can be stably stacked upon one another;
   wherein, when the cover layer is removed, the subcombination floats in a body of water and chemical agents seep into the body of water via the side wall perforations; and
   wherein, when the subcombination is floated in a body of water, water from the body of water seeps into the container via the side wall perforations until equilibrium is established, and after equilibrium is established, the subcombination continues to float in the body of water.

32. The combination of claim 31 wherein the chemical agents are algae fertilizers.

33. The combination of claim 31 wherein the flotation enhancer is a layer of closed cell foam.

34. The combination of claim 31 wherein a spacer disk is loosely disposed horizontally between the flotation enhancer and the chemical agents.

35. The combination of claim 31 wherein the spacer disk is attached to the anchor by the anchor line.

36. A combination useful for dispensing algae fertilizers into a body of water, the combination comprising:
   (a) a subcombination comprising:
      (i) a container having a top, a bottom and side walls, the side walls being perforated with a plurality of side wall perforations, the perforations each having an open area between about 0.02 square inches and about 0.05 square inches;
      (ii) dry algae fertilizers within the container;
      (iii) an upper layer of closed cell foam disposed above the chemical agents; and
      (iv) an anchor tethered to the container via an anchor line;
   (b) a removable cover layer disposed over the side wall perforations to prevent leakage through the side wall perforations until the cover layer is removed, the cover layer comprising a flexible material; and wherein the combination further comprises a top wall and a bottom wall; wherein the bottom wall is adapted to nest within the top wall of a like container, so that a plurality of containers can be stably stacked upon one another;

wherein, when the cover layer is removed, the subcombination floats in a body of water and the chemical agents seep into the body of water via the side wall perforations; and wherein, when the subcombination is floated in a body of water, water from the body of water seeps into the container via the side wall perforations until equilibrium is established, and after equilibrium is established, the subcombination continues to float in the body of water.

* * * * *